United States Patent
Tamayo et al.

(10) Patent No.: US 7,752,029 B2
(45) Date of Patent: Jul. 6, 2010

(54) METHOD TO CHANGE USB DEVICE DESCRIPTORS FROM HOST TO EMULATE A NEW DEVICE

(75) Inventors: Paolo A. Tamayo, Pleasant Hill, CA (US); John Flores Miguel, Pittsburg, CA (US); Yuichi Komori, Pleasant Hill, CA (US)

(73) Assignees: Kyocera Mita Corporation, Osaka-shi (JP); Kyocera Technology Development, Inc., Concord, CA (US)

( * ) Notice: Subject to any disclaimer, the term of this patent is extended or adjusted under 35 U.S.C. 154(b) by 526 days.

(21) Appl. No.: 11/473,961

(22) Filed: Jun. 23, 2006

(65) Prior Publication Data

US 2007/0299650 A1 Dec. 27, 2007

(51) Int. Cl.
*G06F 9/455* (2006.01)
(52) U.S. Cl. .............................. 703/24; 703/20; 703/21
(58) Field of Classification Search .................. 703/13, 703/14, 20, 21, 24, 25
See application file for complete search history.

(56) References Cited

U.S. PATENT DOCUMENTS

| | | | |
|---|---|---|---|
| 6,574,588 B1 * | 6/2003 | Shapiro et al. ............... | 703/24 |
| 6,954,808 B2 * | 10/2005 | Russell ........................ | 710/62 |
| 2002/0156952 A1 | 10/2002 | Shono | |
| 2003/0167376 A1 | 9/2003 | Koh | |
| 2004/0254014 A1 | 12/2004 | Quraishi | |
| 2005/0066087 A1 * | 3/2005 | Wu ............................. | 710/63 |
| 2005/0236491 A1 | 10/2005 | Leaming | |
| 2005/0240695 A1 | 10/2005 | Leaming | |
| 2005/0240704 A1 | 10/2005 | Leaming | |
| 2005/0240711 A1 | 10/2005 | Watanabe | |

* cited by examiner

*Primary Examiner*—Kamini S Shah
*Assistant Examiner*—Herng-Der Day

(57) ABSTRACT

A method for changing operation of a device, comprising: sending target device descriptors to the device's device emulator, which processes and stores the descriptors as the current descriptors in memory, and the device emulator responding to a query from a host simulating operation of the target device. Using the method, the host recognizes the device as a different, target device, such as printers, MFPs, peripherals, digital cameras, etc. Device emulation enables installation and other testing of a new and yet unavailable target device under development. The methods also include USB device enumeration, making a print job containing extended PJL commands and sending it using a generic device driver, emulator firmware analyzing and storing the descriptors in registers, sending a line reset command to simulate device detachment and reattachment, and meeting timing requirements of USB detached and attached states.

15 Claims, 5 Drawing Sheets

| 410 | Device attachment |
|---|---|

| 420 | Host enumeration based on generic device driver |
|---|---|

| 430 | Host sends using generic device driver new target device descriptors using a print job containing extended PJL commands |
|---|---|

| 440 | Device emulator processes PJL commands, and saves new target descriptors in memory (and registers) as current descriptors |
|---|---|

| 450 | Device emulator performs USB line reset (using an extended PJL command) (meeting timing requirements of USB detached & attached states) |
|---|---|

| 460 | Host enumeration based on device driver under test (Device emulator simulates a new target device) |
|---|---|

FIG. 4

500  Sample extended PJL commands

| | |
|---|---|
| @PJL KUSBDEVICEID MFG="Manufacturer Name" | (1) |
| @PJL KUSBDEVICEID MDL="Model Name" | (2) |
| @PJL KUSBCONFDESC NUMIF=2 | (3) |
| @PJL KUSBIFDESC IF=0 CLASSCODE=7<br>@PJL KUSBIFDESC IF=1 CLASSCODE=255 | (4) |
| @PJL KUSBIFDESC IF=0 SUBCLASSCODE=1<br>@PJL KUSBIFDESC IF=1 SUBCLASSCODE=255 | (5) |
| @PJL KUSBIFDESC IF=0 IFNAME="New Printer"<br>@PJL KUSBIFDESC IF=1 IFNAME="New Scanner" | (6) |

FIG. 5

METHOD TO CHANGE USB DEVICE DESCRIPTORS FROM HOST TO EMULATE A NEW DEVICE

FIELD OF THE INVENTION

This invention relates to device emulation, and more particularly to dynamically changing device descriptors of a USB device from a host to emulate a new device using a simple hardware emulator.

BACKGROUND OF THE INVENTION

There are circumstances in which it would be useful to have a device emulate or simulate behavior and operations of another device. One such situation is for testing of a new and yet unavailable target device under development, such as printers, MFPs, peripherals, digital cameras, etc. The number of these new devices being developed is constantly increasing, and demands shorter and more efficient development and testing cycles. If an existing device can be made to emulate a target device, then installation and other testing can begin without waiting for completion of the target device. The present invention arose out of the above perceived needs and concerns associated with device emulation. The present invention proposes a method by which a host recognizes a device as a different, target device.

SUMMARY OF THE INVENTION

Methods, computer program products, computing and printing systems for changing USB device descriptors from host to emulate a new device are described. The methods enable dynamically changing device descriptors of a USB device from a host to emulate a new device using a simple hardware emulator.

The method for changing operation of a device comprises of: sending target device descriptors to the device's device emulator, which processes and stores the descriptors as the current descriptors in memory, and the device emulator responding to a query from a host simulating operation of the target device.

The methods also include USB device enumeration, making a print job containing extended PJL commands and sending it using a generic device driver, emulator firmware analyzing and storing the descriptors in registers, sending a line reset command to simulate device detachment and reattachment, and meeting timing requirements of USB detached and attached states.

The invention will be more fully understood upon consideration of the detailed description below, taken together with the accompanying drawings.

DESCRIPTION OF THE DRAWINGS

FIG. 4 is a flowchart showing the processing steps for sending device descriptors using PJL commands, and simulating a line reset, in accordance with a preferred embodiment of the present invention.

FIG. 5 shows some sample extended PJL commands specifying target device descriptors, in accordance with a preferred embodiment of the present invention.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
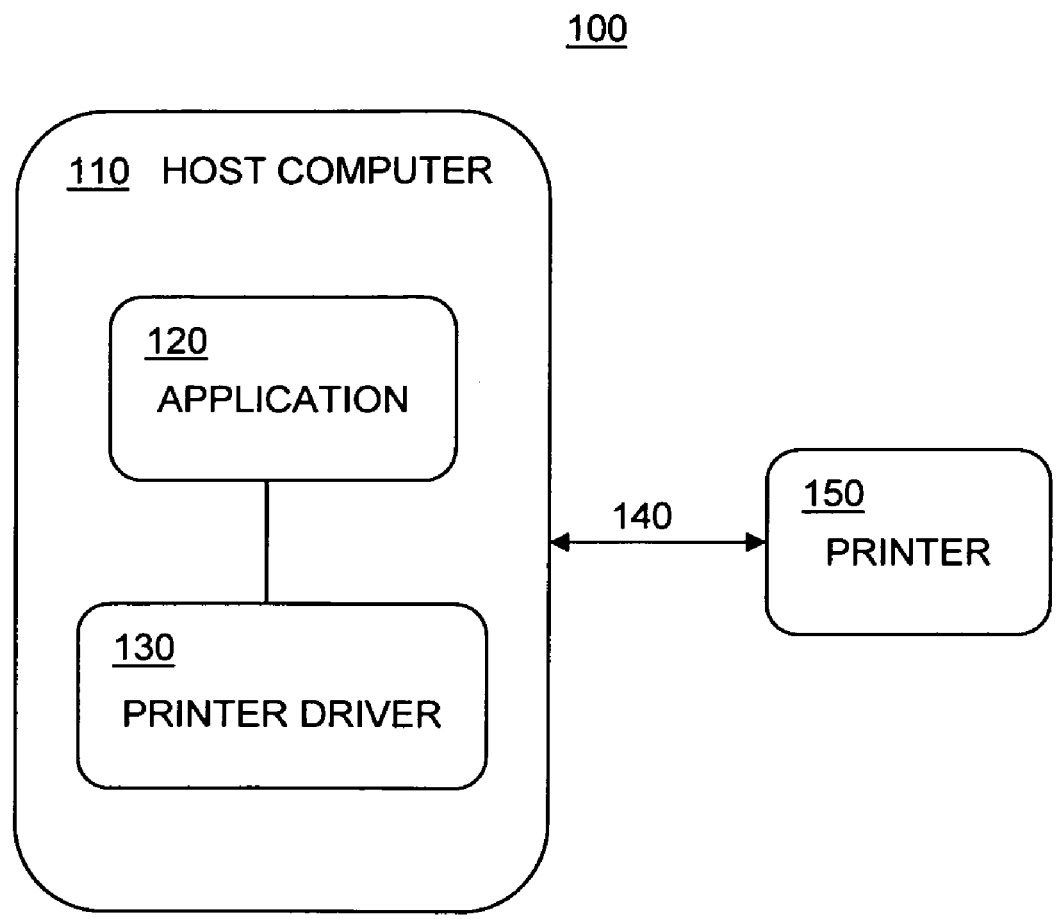
FIG. 1 is a simplified block diagram showing connection of a computing system to a printer, in accordance with a preferred embodiment of the present invention.

FIG. 1 is a simplified block diagram showing connection of a computing system to a printer, in accordance with a preferred embodiment of the present invention. FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver, but they are to be understood as similarly applicable to other kinds of device drivers.

Figure 2:
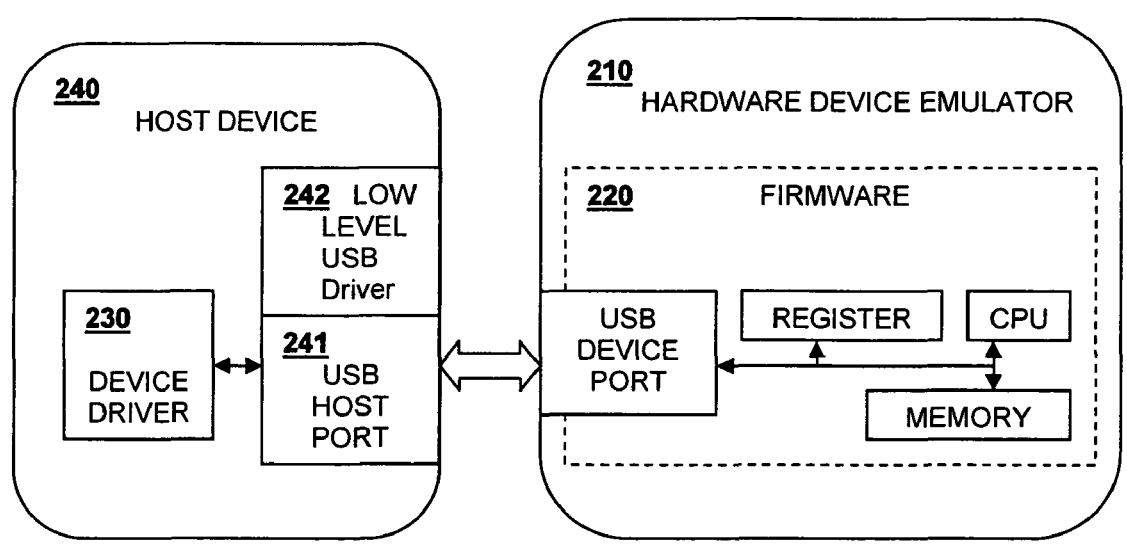
FIG. 2 is a block diagram showing a host device and the connected device containing a hardware device emulator, in accordance with a preferred embodiment of the present invention.

FIG. 2 is a block diagram showing a host device and the connected device containing a hardware device emulator, in accordance with a preferred embodiment of the present invention. The invention is composed of four main components. The hardware emulator 210 emulates the target hardware. The firmware 220 runs in the device emulator. A generic device driver 230 enables communication on the device emulator to set up the required hardware descriptors and emulate the target hardware. The host device 240 performs the installation and set-up of the device emulator. This host device will effectively test the device driver.

The host device 240 will contain the device driver, a low level USB Driver 242 and the USB Host Port 241. The low level USB driver 242 is usually packaged with the host system. The USB Host Port 241 monitors for any new device attachment on the USB lines. Once an attachment is detected it will notify the host device using the low level USB drivers of the host system. This will result in the host performing the enumeration on the device to select the correct device driver by the user or the host system. The host will then load the selected device driver using the configuration received from the descriptors.

In any computer based systems found in homes and offices there is a prevalence of peripheral devices that perform the functionality of various standard office functions. Printers, scanners, fax and human interfaces devices are increasingly seen as essential components and have emerged as de-facto standard of such systems. As more and more homes and offices are acquiring such systems, the trend of such devices is focusing on bundled equipment known as multi-functional products (or peripherals).

Competition on these peripheral devices has prompted most design companies to do parallel development of hardware and software components of these products. Demand for such peripheral devices mandates the use of the Universal Serial Bus (USB) support due to the ease of integration of these devices into existing systems and USB being an accepted standard on device interfaces. However, parallel development of hardware and software components has its benefits and drawbacks. Product development time is indeed improved but new bottlenecks emerge and challenge the project schedules. For example, while the actual hardware device is still in development, some software components that are finished ahead of the hardware are pended until the hardware component becomes available. This imposes delays on testing of components due to unavailability of required modules.

Components such as the plug and play functionality of the drivers, an important feature of the USB protocol, can actually proceed with testing if a device can be available that emulates the actual target hardware. This device emulator would be useful even if it is limited only to the installation part of the software driver intended for the target hardware device. From the USB interface point of view, testing of the software components that are responsible for the configuration and setting up of the device can be carried out. The software components responsible in carrying out the actual functionality intended for the device will have to wait until the actual device is available.

From the above concerns and discussion, the need to implement some form of device emulator to enable the development of the components (especially for the device driver) of the peripheral devices to proceed is essential. By taking advantage of the USB protocol specifications, the device emulator can be built to serve as a test jig for the installation and set up of such devices. Installation and set up of these devices is done during the configuration and set-up protocol of the USB device. If the device emulator meets all the requirements for the device configuration and set up, the host will be made to believe that the device emulator is the actual device with all the functionality ready for the user. In other words, a USB device can still be seen by the USB host controller as a fully operational device during initialization as long as the USB device gives the correct replies to the host.

Configuration and set up of the device is initiated after the detection of the attachment of the device to the host device 240. This detection is handled by the special circuitry in the USB protocol and should be followed by any USB compliant hardware. After the host 240 detects the device attachment, it initiates the device enumeration. The device enumeration is a host activity that processes the device. This is done by identifying the device and assigning a unique address to that device. Once the unique address is assigned, the host then sends a series of commands to set up the communication pipes of the device. This series of commands will establish the detailed identity of the USB device. It will also inform the host of its capabilities and gives the host the ability to correctly assign the device driver that will work for the device. All of these are possible by the use of the device descriptors. The device descriptors are data structures in the device that describe the device capabilities and how these capabilities will be used. Every time there a disconnection-reconnection of the device, the host will automatically perform the device enumeration but will skip the device driver installation once it senses that the same device is being reconnected to the host.

On the device side, a default set of device descriptors is provided. The default set of descriptors are stored in the memory of the device or the device emulator 210. Upon power up, the default set of descriptors are copied into the volatile memory called registers allotted for the current set of descriptors. The current descriptors are used for replies to the host. This allows the device to perform the configuration and set up step successfully. This permits the device emulator to meet all the USB requirements in this step. The default set of descriptors enables the host to initialize the device and establish the communications between the host and the device at the beginning of the process.

Figure 3:
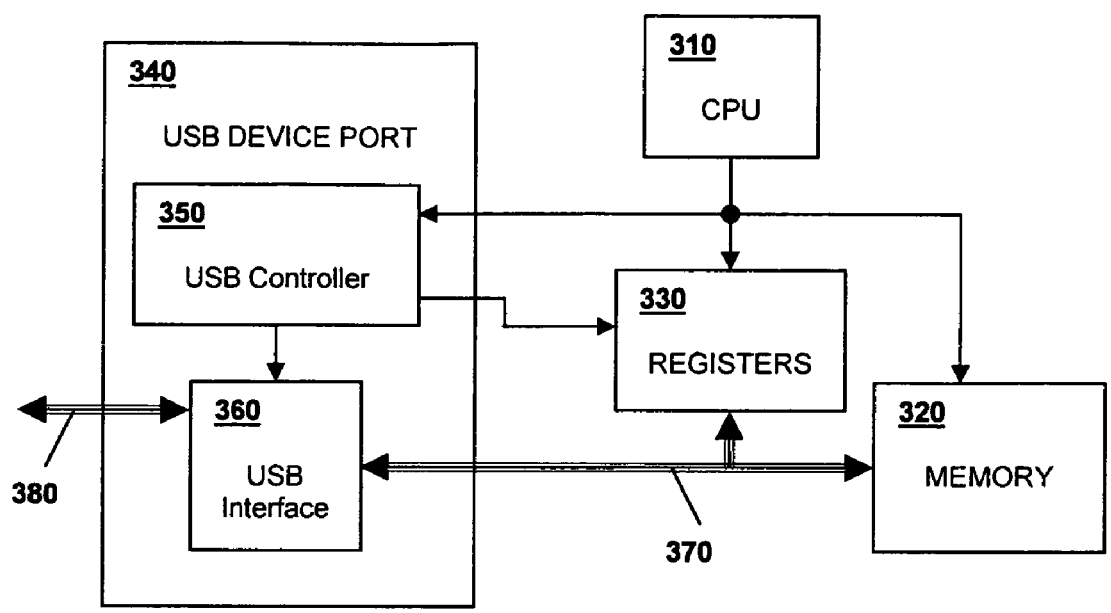
FIG. 3 is a block diagram showing the components of a hardware device emulator, in accordance with a preferred embodiment of the present invention.

FIG. 3 is a block diagram showing the components of a hardware device emulator, in accordance with a preferred embodiment of the present invention. The hardware emulator is composed of a microprocessor (CPU) 310, memory 320, registers 330, USB Device Port 340, and a firmware coordinating the operations of all the modules. The USB Device Port in turn, is composed of the USB controller 350, and the USB Interface 360. A set of registers 330 mentioned earlier is provided. These registers are volatile memory that will hold the descriptors. At power up, the register contents are initialized with the default descriptors. The default descriptors are stored in the non-volatile memory. An internal data bus 370 connects the USB interface 360, the registers 330, and memory 320. A USB line 380 connects an external device, such as a host, and the device emulator through the USB interface 360. The USB Device Port 340 controls the signaling requirements of the USB line. Simulation of the detachment and attachment of the USB cable can be performed by the USB Device Port. This is done by manipulating the USB signal lines to perform the required signaling as defined by the USB 2.0 Device Specifications.

The USB Controller 350 on the other hand detects the commands coming from the host into the USB Interface 360. At the same time, the USB Controller 350 organizes the responses to the host. The USB Controller 350 basically enables the hardware emulator to communicate to the Host using the USB protocol. The TJSB Controller 350 is directly responsible for the responses to the host during plug and play event by sending the appropriate responses during device enumeration. The microprocessor runs the firmware residing on the hardware emulator. The firmware running in the device emulator in turn handles the power up and initialization of the hardware emulator and more importantly processes the PJL commands that trigger the modification of the device descriptors of the hardware emulator. When the host sends a new set of PJL commands, the firmware checks the commands for changes to the device descriptors. When new descriptors are sent, the contents of the registers are updated. Subsequently the descriptors are stored into the memory. The memory serves as storage of the current device descriptors when the device is powered down or a reset is performed. The buffers serve as the fast access memory for the enumeration step of the host.

The device emulator, at the minimum, should support the eleven standard requests for Control Transfers. These standard requests listed below are enough to perform the configuration and set up of the device. Details on the definition and descriptions of the standard device requests are available in the USB Specifications.

1. Get Status—Request to get the current status of the features of a device.
2. Clear Feature—Request to disable the feature on a device.
3. Set Feature—Request to enable the feature on a device.
4. Set Address—Request used to assign a specific address to the device.
5. Get Descriptor—Request for a specific descriptor.
6. Set Descriptor—Request to add a descriptor or update an existing descriptor.
7. Get Configuration—Request to get the value of the current device configuration.
8. Set Configuration—Request to the device to use the selected configuration.
9. Get Interface—Request the current setting of the interface.
10. Set Interface—Request to the device to use the specific interface setting.
11. Synch Frame—Request for the device to set and report the endpoint synchronization frame.

To meet the requirements of the standard device requests listed above, the device emulator implements the following default device descriptors.

1. Device Descriptor—provides the basic information of the device. This descriptor provides additional information to the host on how to retrieve additional information from the device.
2. Device Qualifier Descriptor—this descriptor provides the speed characteristic of the device, the configurations that the device support and device class codes.
3. Configuration Descriptor—this descriptor defines in details the characteristics of each configuration defined in the Device Qualifier Descriptor. This descriptor essentially describes the device's features and abilities.
4. Endpoint Descriptor—each endpoint will have this descriptor. This describes in detail each endpoint specified in the Configuration Descriptor.
5. String Descriptor—This descriptor contains texts that can describe the device in detail (usually used for manufacturer's ID, serial number of the device, and product ID).

Device emulation can be achieved by changing the responses given by the device emulator to the host. By sending a new set of device descriptors, the host senses that a new device is connected to the USB port. To be able to do device emulation in this context, a method to change the device descriptor of the device emulator is employed. The method effectively changes the device descriptors in the device emulator so that the next time the host enumerates the device, a different set of descriptor is passed on to the host. To trigger the re-enumeration of the device emulator, an event is generated within the device emulator that resets the USB connection of the device emulator system. This event can be initiated by the host or by the user. The resulting action simulates the disconnection and reconnection of a device. From the host point of view a new device is connected to the host.

FIG. 4 is a flowchart showing the processing steps for sending device descriptors using PJL commands, and simulating a line reset, in accordance with a preferred embodiment of the present invention. In this flowchart, the methods to carry out the operation of changing the device descriptor of the device emulator are summarized.

In step 410, the Host Device detects that a new device is connected to the USB port. This device detection is handled by the USB Host Port circuitry and the USB Host driver software. The Host Device is informed by the USB Host driver software through system interrupts.

In step 420, after the host senses a new device connection, it runs the enumeration process to initialize the device emulator into the host system. Host assigns a unique address to the device. Host then retrieves the device descriptors that will enable the host to select the correct device driver. The default device descriptors will have to indicate that the device is a printer device. Host then searches for the correct device driver. Host assigns the generic driver to the device emulator. At this point a generic driver is assigned to the device to establish communication between the host and the device.

In step 430, the user then creates a text file composed of the extended PJL commands. The commands chosen correspond to the extended PJL commands that will change the appropriate device descriptors in the device emulator. This text file is then sent to the device emulator, like a simple print job, using the assigned generic driver. The new device descriptors being sent to the device will describe the target device of the driver under test.

In step 440, the firmware running in the device emulator receives the print job and interprets the PJL commands within the print job. After checking the commands for errors, firmware saves the new device descriptors in the memory and registers provided. The saving of the new descriptors will overwrite the current descriptors but will not overwrite the default descriptors. Current descriptors are the descriptors that are being sent to the host when the host sends the enumeration commands.

In step 450, the last PJL command that the host sends is another extended PJL command to reset the USB lines. The firmware then calls the USB line reset sequence. This USB line reset sequence forces the device emulator to place the USB lines to a detached state. This is accomplished by meeting the requirements of the USB specifications on detached state. After meeting the duration timing requirements for a detached state, the attached state is then assumed by the USB lines.

In step 460, from the point of view of the host, the sequence in step 450 will be seen as a new device is connected to the USB port. The host then performs an enumeration and discovers that a new device is connected to the port since a new set of device descriptors is sent by the device emulator. Host then selects the driver appropriate for this new device which triggers the installation of the driver being tested.

FIG. 5 shows some sample extended PJL commands specifying target device descriptors, in accordance with a preferred embodiment of the present invention. The example shows the commands to perform a change in the Manufacturer's names (1), changing the model name (2), modifying the number of interfaces (3), assigning the class codes of the device (4), assigning the sub-class codes of the device (5) and assigning a device name (6). The device emulator firmware will parse these commands and determine which of the reconfigurable items are to be replaced in the descriptors.

To change the device descriptors of the hardware emulator, the methods of this invention utilize the PJL (Printer Job Language) commands supported by the devices under test. PJL was developed to have job level control of the print jobs. Through PJL, it is possible to switch from one printing language to another on the job level. It also provides job status to the host computer. PJL was implemented using a standard set of commands. From the standard set of PJL commands, a set of new PJL commands are implemented. This new set of commands extends the current PJL commands to include the modification of the device descriptors of the device emulator. Due to this, reconfiguring the device can be carried out from the host side through the PJL commands. When the modification is complete, the device emulator will be responding to the host with the new set of device descriptors when the host re-enumerates the device. This re-enumeration can be triggered by the device driver under test through another PJL command that will initiate the reset of the USB port of the device emulator. The user can also trigger the device re-enumeration by detaching the device from the USB port and re-attaching the device.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although the terminology and description of this invention may seem to have assumed a certain platform, one skilled in this art could see how the disclosed methods can be used with other operating systems, such as Windows, DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for enabling a USB (Universal Serial Bus) device to emulate a USB target device by changing operation of the device, enabling the device to serve as a test jig for the installation and set up concerning the target device, comprising:
    providing a device emulator within the device;
    attaching the device to a host device;
    identifying the device being a printer device by setting default device descriptors;
    sending at least one target device descriptor, which is the at least one device descriptor of the target device, to the device emulator, by making a print job containing extended PJL (Printer Job Language) commands corresponding to the least one target device descriptor and sending the print job from the host device to the device using a generic driver;
    the device emulator processing the at least one target device descriptor and storing the at least one target device descriptor as at least one current descriptor in a memory of the device emulator; and
    the device emulator responding to a query from the host device by operating according to an operation of the target device by emulating the identity of the target device, which identity is specified by the at least one current descriptor.

2. The method of claim 1, wherein the operation of the device emulator responding to the query from the host device according to the operation of the target device occurs during device enumeration by the host device.

3. The method of claim 1, wherein the device emulator processing the at least one target device descriptor comprises a firmware of the device emulator analyzing the extended PJL commands in the print job, and optionally comprises storing the at least one target device descriptor in a register of the device emulator.

4. The method of claim 1, further comprising the host device sending a command to reset a line connecting the host device and the device emulator to simulate a detached state followed by reattached state.

5. The method of claim 4, wherein the command to reset the line is an extended PJL command to reset a USB line, which causes actions comprising:
    a firmware of the device emulator calling a USB line reset sequence;
    meeting timing requirements of a USB detached state;
    the USB line assuming an attached state; and
    the host device discovering the device as a newly attached device and starting enumeration.

6. A computer program product for enabling a USB (Universal Serial Bus) device to emulate a USB target device by changing operation of the device, enabling the device to serve as a test jig for the installation and set up concerning the target device, relating to an operation of an image forming and printing apparatus, comprising machine-readable code on a computer-readable medium for causing a machine to perform the method steps of:
    providing a device emulator within the device;
    attaching the device to a host device;
    identifying the device being a printer device by setting default device descriptors;
    sending at least one target device descriptor, which is the at least one device descriptor of the target device, to the device emulator, by making a print job containing extended PJL (Printer Job Language) commands corresponding to the at least one target device descriptor and sending the print job from the host device to the device using a generic device driver;

the device emulator processing the at least one target device descriptor and storing the at least one target device descriptor as at least one current descriptor in a memory of the device emulator; and the device emulator responding to a query from the host device by operating according to an operation of the target device by emulating the identity of the target device, which identity is specified by the at least one current descriptor.

7. The computer program product of claim 6, wherein the operation of the device emulator responding to the query from the host device according to the operation of the target device occurs during device enumeration by the host device.

8. The computer program product of claim 6, wherein the device emulator processing the at least one target device descriptor comprises a firmware of the device emulator analyzing the extended PJL commands in the print job, and optionally comprises storing the at least one target device descriptor in a register of the device emulator.

9. The computer program product of claim 6, further comprising machine-readable code for causing the machine to perform the method step of: the host device sending a command to reset a line connecting the host device and the device emulator to simulate a detached state followed by reattached state.

10. The computer program product of claim 9, wherein the command to reset the line is an extended PJL command to reset a USB line, which causes actions comprising:

a firmware of the device emulator calling a USB line reset sequence;

meeting timing requirements of a USB detached state;

the USB line assuming an attached state; and the host device discovering the device as a newly attached device and starting enumeration.

11. A computing system for enabling a USB (Universal Serial Bus) device to emulate a USB target device by changing operation of the device, enabling the device to serve as a test jig for the installation and set up concerning the target device, comprising:

providing a device emulator within the device;
attaching the device to a host device;
identifying the device being a printer device setting default device descriptors;

sending at least one target device descriptor, which is the at least one device descriptor of the target device to the device emulator by making a print job containing extended PJL (Printer Job Language) commands corresponding to the at least one target device descriptor and sending the print job from the host device to the device using a generic device driver;

the device emulator processing the at least one target device descriptor and storing the at least one target device descriptor as at least one current descriptor in a memory of the device emulator; and the device emulator responding to a query from the host device by operating according to an operation of the target device by emulating the identity of the target device, which identity is specified by the at least one current descriptor.

12. The computing system of claim 11, wherein the operation of the device emulator responding to query from the host device according to the operation of target device occurs during device enumeration by the host device.

13. The computing system of claim 11, wherein the device emulator processing the at least one target device descriptor comprises a firmware of the device emulator analyzing the extended PJL commands in the print job, and optionally comprises storing the at least one target device descriptor in a register of the device emulator.

14. The computing system of claim 11, further comprising the host device sending a command to reset a line connecting the host device and the device emulator to simulate a detached state followed by reattached state.

15. The computing system of claim 14, wherein the command to reset the line is an extended PJL command to reset a USB line, which causes actions comprising:

a firmware of the device emulator calling a USB line reset sequence;

meeting timing requirements of a USB detached state;

the USB line assuming an attached state; and the host device discovering the device as a newly attached device and starting enumeration.

* * * * *